(No Model.)

N. LEONARD.
SUPPORT FOR PLANTS.

No. 516,632. Patented Mar. 13, 1894.

WITNESSES:
Chas. W. Marvin.
M. M. Borst.

INVENTOR
Newton Leonard
BY
Smith & Denison
ATTORNEYS.

THE NATIONAL LITHOGRAPHING COMPANY,
WASHINGTON, D. C.

UNITED STATES PATENT OFFICE.

NEWTON LEONARD, OF WASHINGTON MILLS, ASSIGNOR OF ONE-HALF TO LADD J. LEWIS, JR., OF NEW HARTFORD, NEW YORK.

SUPPORT FOR PLANTS.

SPECIFICATION forming part of Letters Patent No. 516,632, dated March 13, 1894.

Application filed November 6, 1893. Serial No. 490,133. (No model.)

*To all whom it may concern:*

Be it known that I, NEWTON LEONARD, of Washington Mills, in the county of Oneida, in the State of New York, have invented new and useful Improvements in Supports for Plants, of which the following, taken in connection with the accompanying drawings, is a full, clear, and exact description.

This invention relates to devices for supporting plants after they have grown to the height when the fruit begins to appear.

My object is to produce a device for supporting the lateral branches, sprigs and arms of plants of various kinds, and incidentally to sustain them in their upright position when laden with fruit, having particular reference to tomato plants, although I do not limit myself to any particular plant, as it is my object to produce a device for supporting plants in general, and to that end my invention consists in the several new and novel combination of parts, and features hereinafter described and which are specifically set forth in the claim hereunto annexed. It is constructed as follows, reference being had to the accompanying drawings, in which—

Figure 1:
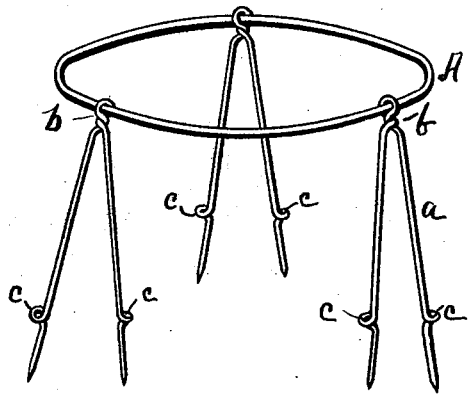
Figure 2:
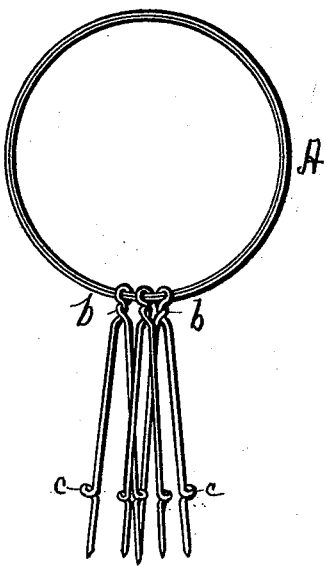
Figure 3:
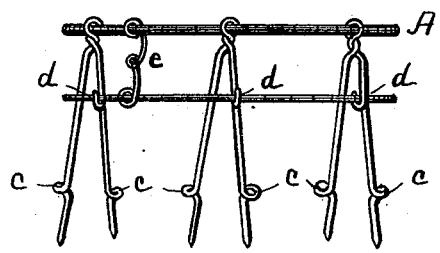

Figure 1, shows a view of the device complete, set, ready for use. Fig. 2, is a view thereof with the supports all thrown to one side of the rim, and as it appears when in knock-down position, for the purpose of hanging up for storage. Fig. 3, is a view similar to Fig. 1, except that it is provided with a supplemental or auxiliary supporting band.

Similar letters of reference indicate corresponding parts.

A— is a band, or preferably a rod, constructed of any material desired, bent in the form of a hoop as shown, or having the ends welded or otherwise secured together.

—a— are the supports or legs constructed preferably by bending a metallic rod to form an eye to fit upon the band or hoop —A—, giving it a lateral twist as shown at —b— if desired, in either case adapting said legs to fit upon the band —A—, then at a short distance from the opposite ends each leg being bent so as to form an eye or shoulder —c—. This shoulder —c— is for the purpose of preventing the legs from sinking too far into the ground. The opposite ends of the legs —a— are preferably slightly separated as shown in the drawings so as to give them greater supporting powers and also to give them greater lateral support. In Fig. 3, I show hooks —d— secured to the legs for the purpose of supporting an auxiliary band, and —e— is a supporting or connecting link having its upper end secured to the upper band and the lower band or hoop passing through its lower eye.

I do not limit myself to two bands, as it will be evident that several auxiliary bands may be used to support the plant according to its height.

When it is desired to take the device up in the fall, I simply take hold of one side of the hoop and pull the legs out of the ground and allow them to all fall together, as shown in Fig. 2, then they may be hung up so as to occupy a minimum amount of space.

What I claim, and desire to secure by Letters Patent, is—

A device for supporting plants comprising a hoop, supporting legs having eyes at the top to inclose the hoop and bends near the lower ends, forming shoulders to prevent sinking in the ground, said ends being spread apart for the purpose of giving lateral support to the legs, as set forth.

In witness whereof I have hereunto set my hand this 17th day of October, 1893.

NEWTON LEONARD.

In presence of—
 LADD J. LEWIS,
 L. J. LEWIS, Jr.